Figure 4:
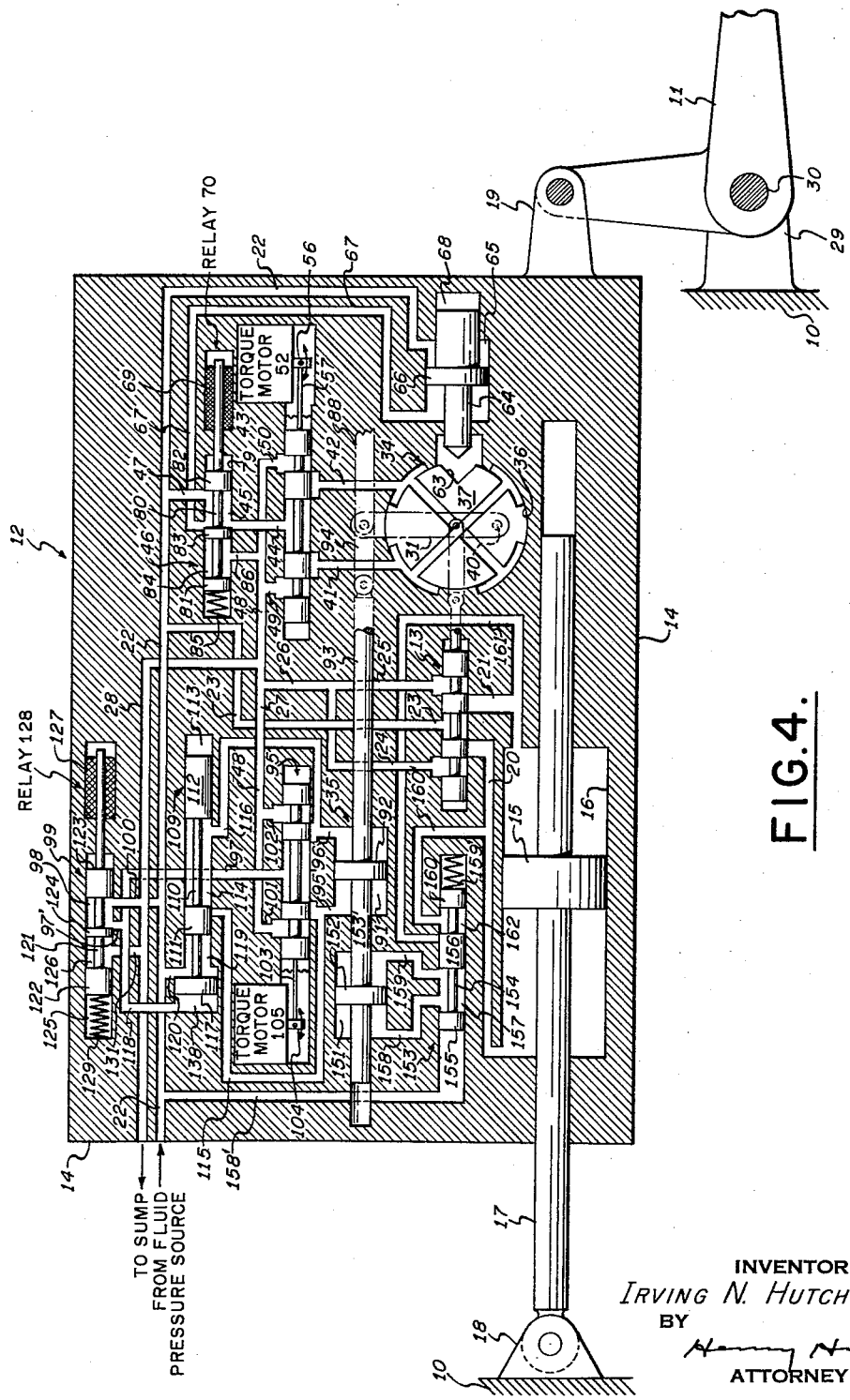

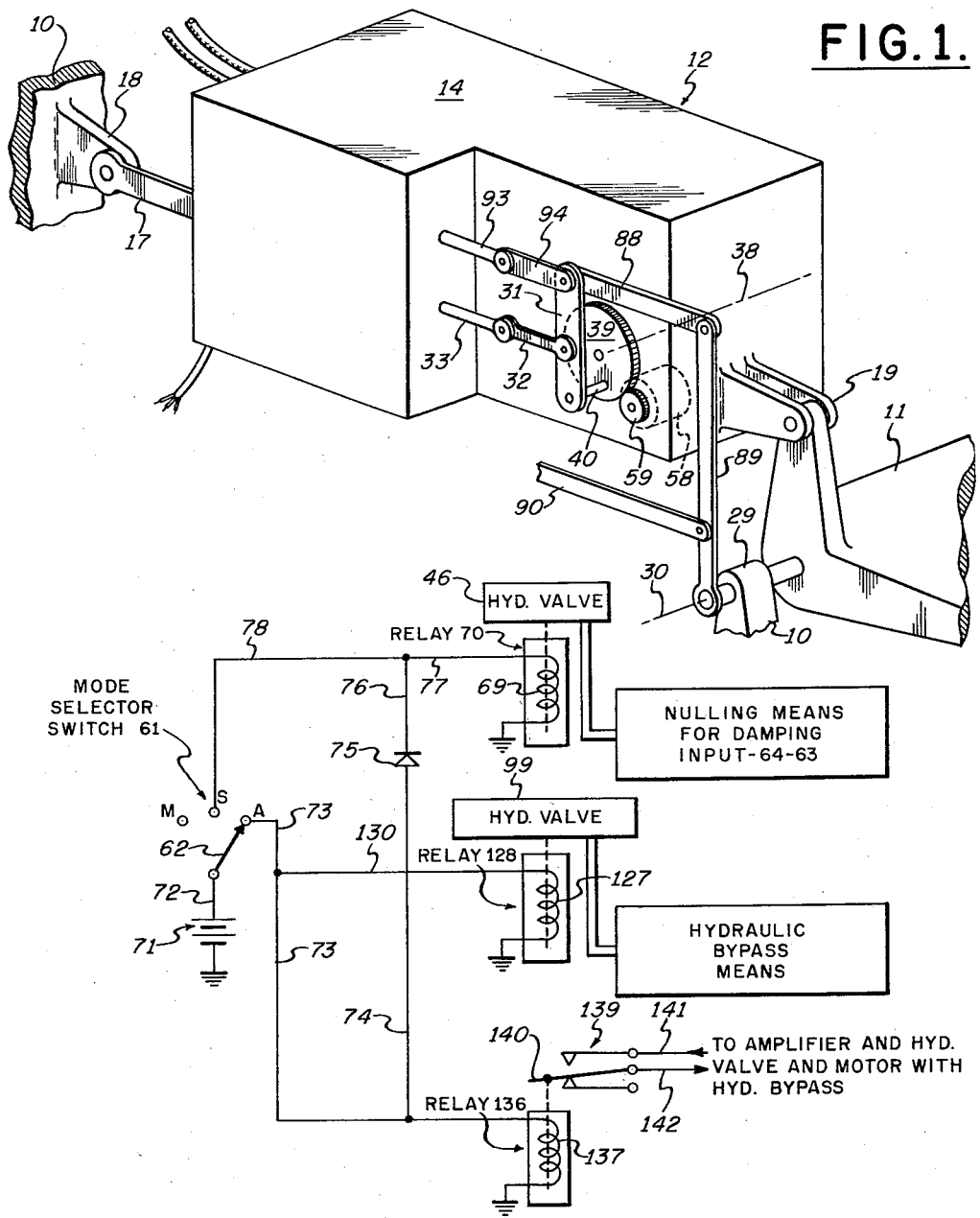

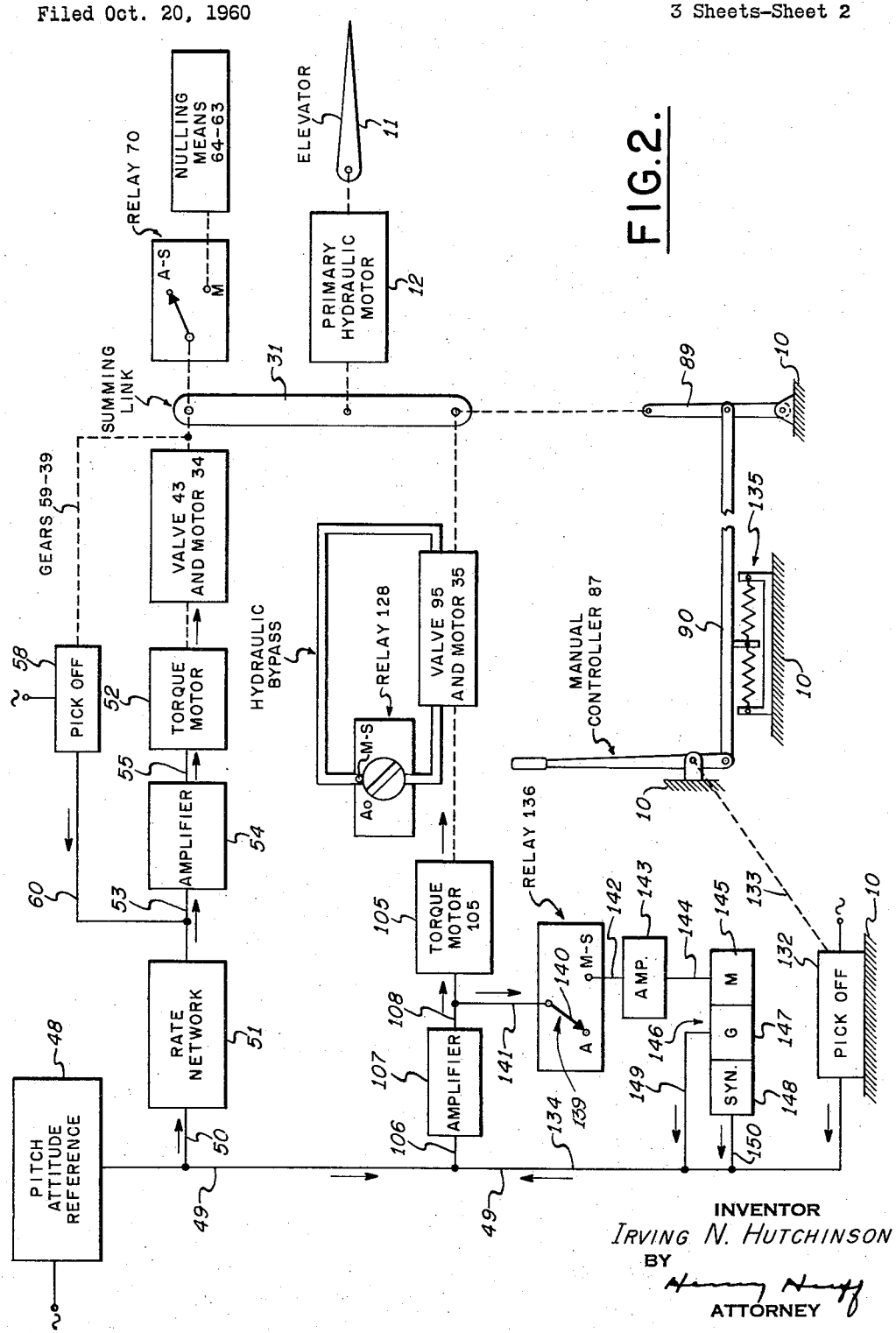

United States Patent Office 3,043,541
Patented July 10, 1962

3,043,541
COMBINED MANUAL AND AUTOMATIC SERVO SYSTEM
Irving N. Hutchinson, Syosset, N.Y., assignor to Sperry Rand Corporation, Great Neck, N.Y., a corporation of Delaware
Filed Oct. 20, 1960, Ser. No. 63,812
13 Claims. (Cl. 244—78)

This invention relates to a combined manual and automatic servo system for controlling the attitude of a dirigible craft about an axis. In the embodiment of the invention shown in the drawings, the craft is an aircraft with elevators and the primary hydraulic motor of the system is operatively connected to the elevators to move the craft about its pitch axis.

The system includes a summing link or differential means connected to move the control valve of the primary hydraulic motor. The respective manual and automatic ends of the improved servo system are provided by a manually operable controller or pivoted stick on the craft that is controlled by the human pilot and automatic pilot components whose displacement and rate outputs are connected through suitable servomotors to provide separate inputs to the summing link or differential. The input to the summing link of the system from the manually operable controller is operable alternatively to the input thereto from the displacement operating servomotor of the automatic pilot. The improved system is operable in manual, stability and automatic modes. When the system is conditioned for operation by the manually operable controller in the manual mode the input to the link from the rate output of the automatic pilot is nulled. In the stability mode of operation, the system is conditioned to include the manually operable controller connected to provide one of the inputs to the summing link. The other of the inputs to the link in this mode of operation is provided by the servomotor of the system connected to receive the rate output of the automatic pilot. The stability mode of operation of the system is accordingly semi-automatic and is used by the human pilot to maneuver the craft about its pitch axis. The manual mode is reserved for safety to enable the craft to be maneuvered in the event of failure of the system. In the third or automatic mode of operation the respective inputs to the link are made by the automatic pilot servomotors and the manually operable controller of the system follows the movements of the link.

The primary object of the present invention is to provide a combined manual and automatic servo system of the character described in which an automatic pilot provides damping for the system that does not result in movement of the manually operable controller.

The improved servo system features a differential means or summing link connection to the control valve for an hydraulic motor whose respective inputs are obtained from servomotors driven by the respective displacement and rate outputs of an automatic pilot where the provided manual controller is also connected to the portion of the link responsive to the displacement output of the automatic pilot.

Another feature of the invention is provided by the alternatively operable means included to condition the system for operation with the manually operable controller in the manual and stability modes or the displacement servomotor of the automatic pilot in the automatic mode.

Still further features of the invention are provided by the conditioning means included to null the input to the summing link from the rate servomotor of the automatic pilot, as well as the means provided to null the input to the displacement servomotor of the automatic pilot.

Where the displacement servomotor of the system is hydraulic, the system also includes an hydraulic bypass for the servomotor as a portion of the conditioning means.

Other objects, features and structural details of the invention will be apparent from the following description when read in relation to the accompanying drawings in which:

FIG. 1 is a perspective view showing the primary hydraulic motor of the system operatively connected to the elevators and frame of an aircraft and showing the summing link or differential means controlling the valve of the hydraulic motor, FIG. 2 is a combined mechanical and electrical schematic showing the interrelated components of the improved combined servo system, FIG. 3 is a circuit diagram showing the connections of the mode selector switch to the relays included in the system as a portion of the conditioning means, and FIG. 4 is a mechanical schematic view showing the internal structure of the housing of the primary hydraulic motor of the system.

As shown in FIGS. 1 and 4, the improved system is embodied for use in an aircraft with a fixed frame portion 10 and an elevator 11. The system includes a primary hydraulic motor 12 having a conventional control valve 13 and a movable housing 14 connected to the craft to follow the motion of the valve. The piston and cylinder of the hydraulic motor 12 are respectively indicated at 15 and 16. To accomplish the followup action in the arrangement provided, the end of the piston rod 17 of piston 15 extending exteriorly of the housing 14 is pivotally connected to the frame 10 of the craft by a suitable bearing bracket 18. The housing 14 is furthermore pivotally connected to the elevator 11 by means of a suitable clevis mounting 19. As shown in FIG. 4, the lands of the valve 13 differentially control the supply of fluid under pressure to the cylinder 16 of the motor 12 by way of connecting passageways 20 and 21. The fluid input to the valve is supplied from a suitable fluid pressure source by way of passageway 22 and connecting passageway 23 in the housing 14. The sump connections from the motor cylinder 16 for the return of the fluid are through one of the passageways 20, 21, through the valve 13 and by way of one of the passageways 24, 25 to passageway 26, connecting passageway 27 to passageway 28. Accordingly, when the control valve 13 moves to the left as viewed in FIG. 4, fluid under pressure is supplied the portion of the cylinder 16 to the left of the piston 15 by way of connected passageways 23 and 20. The portion of the cylinder 16 to the right of the piston 15 is connected to return fluid to the provided sump by way of passageway 21, the valve 13 and connected passageways 25, 26, 27 and 28. With fluid under pressure entering the cylinder 16 to the left of the piston 15, the housing 14 of the hydraulic motor 12 moves to the left in the same direction as the valve 13 as a mechanical nulling followup. This action of the primary motor 12 moves the elevator 11 pivotally mounted in a suitable bearing 29 on frame 10 about an axis 30 in a counterclockwise direction as viewed in FIG. 4 until the housing 14 has moved with relation to the valve 13 to cut off the supply of fluid under pressure to the portion of the cylinder 16 to the left of the piston 15. Reverse movement of the valve 13 results in the reverse operation of the motor and movement of the elevator 11 in a clockwise direction about its axis 30. Either raising or lowering the elevator 11 of the aircraft changes its pitch attitude. The improved system accordingly operates through a primary motor 12 of the character described to control the attitude of a dirigible craft about an axis.

The means included in the improved system to move the valve controlling the operation of motor 12 is provided by a summing link or differential means indicated at 31 in FIGS. 1 and 4. As shown in FIG. 1, the output of the summing differential link 31 is connected to one end of connecting link 32. The other end of link 32 is pivotally connected to the end of a valve stem 33 for the valve 13 extending from the housing 14. The respective inputs to the summing link 31 are provided from suitable servomotors that are carried by the movable housing 14 of the primary hydraulic motor. As shown in FIG. 4, the respective servomotors are hydraulic motors of the rotary and displacement type as respectively indicated at 34 and 35.

Particularly with respect to motor 34, in FIG. 4, a cylindrical chamber 36 is included in the housing 14 in which a rotary piston 37 moves about an axis 38, FIG. 1. A suitable shaft (not shown) having an axis coincident with axis 38 mounted in housing 14 connects the piston 37 to a gear 39, FIG. 1, having an eccentric pin 40 connected to link 31 to provide one of the inputs thereto. The hydraulic control provided in FIG. 4 to move piston 37 about axis 38 within the chamber 36 includes differential passageways 41, 42, a slide valve 43 of the same type as valve 13 mounted in a suitable chamber in the housing 14, fluid pressure passageway 44, the chamber 45 of an hydraulic cut off valve 46 and passageway 47 connecting with the passageway 22 connected to the fluid pressure source. The sump return connections for the motor 34 between the control valve 43 and passageway 28 include connecting passageway 48 and valve sump passageways 49 and 50.

In accordance with the present invention, the improved system is damped by the input to link 31 from motor 34 during operation in either the stability or automatic modes. In these modes, this result is obtained by operating the servomotor 34 in accordance with the rate of change of attitude of the craft about its pitch axis. To provide this type of control, the system accordingly includes suitable automatic pilot means that provides an output depending on the displacement of the craft from a reference attitude about its pitch. Such means also provide a measure of the rate of change of the displacement output which corresponds to the type of input that the servomotor 34 requires. As shown in schematic view FIG. 2, the automatic pilot means included in the system is provided by a suitable pitch attitude reference 48 that may consist of a conventional gyro vertical having a pitch pick-off whose displacement output is fed to the servomotor 34 by way of lead 49, connecting lead 50 to a suitable rate network 51 whose output is fed to torque motor 52 by way of lead 53, amplifier 54 and lead 55. The connection between torque motor 52 and motor 34 is shown in FIG. 4 where the motor per se is indicated as mounted in housing 14 and an extending arm 56 of the rotor of the torque motor 52 is pivotally connected to the end of the valve stem 57 of the slide valve 43 to move the valve with relation to the housing 14 and thus cause operation of the motor 34. The operations of this portion of the system are nulled at the input to the torque motor 52 by feedback means including a suitable pick-off or synchro 58 of the selsyn type whose rotor as shown in FIG. 1 is driven by gear 39 through meshing gear 59 and the connected piston 37 of motor 34. The synchro 58 provides an electrical output that is fed to the amplifier 54 by way of lead 60 and lead 53.

The means provided for conditioning the system for operation in the manual, stability and automatic modes of operation includes a mode selector switch 61 shown in FIG. 3 that is situated in the craft in a suitable location to be set by the human pilot. The switch 61 is provided by an adjustable knife blade 62 and three contact terminals for the blade respectively designated M (manual mode), S (stability mode) and A (automatic mode). The identical designation M, S and A, as utilized in FIG. 2, are indicative of the condition of the relays and the means under control of the relays hereinafter described when the system is functioning in either its manual, stability or automatic mode.

The system includes means for nulling the input to link 31 from servomotor 34. As shown in FIG. 4, this means includes a V-notch 63 in the wall of rotory piston 37 and the cooperative tapered end of a reciprocating plunger 64. The actuator for the plunger 64 is provided by a piston and cylinder arrangement in the housing 14, the cylinder being indicated at 65 and the piston at 66. The plunger 64 and notch 63 are normally disengaged as shown in FIG. 4 as fluid under pressure from the fluid pressure source is supplied to the chamber of the cylinder 65 to the left of the piston 66 as viewed in this figure through the chamber 45 of hydraulic valve 46. A pressure fluid connection between cylinder 65 and chamber 45 in this condition of the parts is provided by passageway 67 which receives the fluid from the supply line 22 by way of passageway 47 into the chamber 45. The chamber of cylinder 65 to the right of the piston 66 in FIG. 4 is directly connected to the fluid pressure source by way of passageway 22. With regard to the cylinder 65, the pressure area to the right of the piston 66 is made smaller than that to the left of the piston 66 by an extension piece 68 of greater cross sectional area than the cross sectional area of the plunger 64. Accordingly, with fluid under pressure supplied to the chamber of the cylinder 65 to the left of the piston 66, the end of the plunger 64 is disengaged from the centering notch 63 in the rotary piston 37.

When the described nulling means is ineffective the system is functioning in either the stability or automatic modes wherein the winding 69 of a relay 70 is energized by the elements included in the circuitry shown in FIG. 3. As therein indicated, the blade 62 set in automatic position closes an electrical circuit including battery 71, lead 72 to the blade 62, the A terminal of the switch, lead 73, lead 74, reverse blocking rectifier 75, lead 76 and lead 77 to the winding 69 of the relay 70. In the stability mode, the circuit to the winding 69 is closed with the blade 62 set in the S terminal position of the switch 61, with lead 78 from the S terminal connecting with input lead 77. In the manual mode, the blade 62 is set in the M position of the switch 61 and the circuit supplying energy to the relay winding 69 is broken.

In the condition of the parts shown in FIG. 4, the winding 69 of relay 70 is energized and the components of the valve 46 are located in the housing 14 accordingly with chamber 45 connecting the passageways 47 and 67. As shown in FIG. 4, hydraulic valve 46 is provided by a cylinder 79 in the housing 14 in which a slide piece 80 includes end lands 81, 82 and center land 83. The chamber 45 in the housing is determined by the portion of the cylinder between lands 82 and 83. The valve arrangement also includes a chamber 84 determined by the portion of the cylinder between lands 83 and 81. One end of the slide piece 80 is provided by the armature of the relay 70. A spring 85 is located at the other end of the slide piece 80 between the end wall of the cylinder 79 and the land 81. When the winding 69 of relay 70 is energized, spring 85 is compressed. When the system operates in the manual mode, the winding 69 is unenergized and the slide piece 80 is then moved to the right as viewed in FIG. 4 by the spring 85 so that chamber 84 then connects passageway 67 of the nulling means to the return or sump passageway 28 by way of passageway 86 and connecting passageway 48. With the portion of cylinder 65 to the left of piston 66 connected to the return fluid line or sump, the plunger 64 is urged to the left as viewed in FIG. 4 to engage the notch 63 by the fluid pressure in the portion of the cylinder 65 to the right of the piston 66. The described arrangement constitutes means for rendering the nulling means effective when the system is conditioned by operation in the manual mode by the manually operable controller thereof. Engagement of the parts of the nulling means provided forces the piston 37 to a centralized condition with relation to the housing 14 and accordingly locates the gear 39 and pin 40 to fix the input end of the link 31 controlled by the servomotor 34.

The manually operable controller of the system is indicated at 87 in FIG. 2. As shown in this view, controller 87 is provided by a conventional stick that is pivotally mounted on the frame 10 of the craft. In accordance with the invention, the stick or controller 87 provides a second input to the summing link 31 when the system is functioning in the stability mode and the only input to the link 31 when the system is functioning in the manual mode. In the automatic mode, the controller 87 is free to follow the motions of the link as influenced by the automatic pilot inputs provided thereto. The connections between stick or controller 87 and the summing link 31 as shown in FIGS. 2 and 1, include a link 88 pivotally connected at one end to the summing link 31, a lever 89 pivotally mounted on the frame 10 of the craft to move about axis 30 connected to link 88 at its other end, and a link 90 connecting the controller 87 to the lever 89. The mechanical arrangement described moves the lever 89 about its axis in accordance with the movement of the controller 87. Link 31 is proportionally urged to move about the axis of pin 40 as the link 88 connected thereto transmits the motion of lever 89.

In the automatic mode of operation of the system, controller 87 is free and the alternate input provided the link 31 is obtained from the servomotor 35 controlled by the displacement output of the automatic pilot means. As shown in FIG. 4 servomotor 35 of the system is a representative type of hydraulic motor having a cylindrical chamber 91 in the housing 14 and a piston 92. The rod 93 of the piston 92 extends exteriorly of the housing 14 as shown in FIG. 1 and is connected to link 31 by connecting link 94 at the same pivot axis of connection as the input link 88 controlled by the controller 87. The control valve provided for motor 35 as indicated at 95 is similar in structure to the valve 13 controlling the primary hydraulic motor. The arrangement shown includes differential passageways 95', 96 between the valve 95 and the respective ends of the cylindrical chamber 91. The fluid input passageway to the valve 95 is indicated at 97. Passageway 97 connects with the fluid pressure source through the chamber 98 of hydraulic valve 99 and passageway 100 to the pressure passageway 22. The sump connections of the motor 35 at the valve 95 are provided by the connecting passageways 101, 102 to return passageways 48 and 28. Operation of the motor 35 is effected by movement of the control valve 95 in the manner previously described for the operation of the primary hydraulic motor. For valve 95, the stem 103 at one end thereof is actuated by the extending arm 104 of a torque motor 105 that is connected to receive the displacement output of the pitch attitude reference 48 of the automatic pilot means by way of lead 49, connecting lead 106, amplifier 107, and lead 108. Servomotor 35 is accordingly operated when the system is functioning in its automatic mode by an output depending on the displacement of the craft from a reference attitude about its pitch axis. When functioning in the automatic mode, the primary input to the link 31 is provided by the servomotor 35 and the secondary input to the link 31 is provided by the servomotor 34 which operates according to the rate of change of attitude of the craft to damp the system. In normal operation, the system functions in the automatic mode with the selector switch 61 conditioned as shown in FIG. 3.

The improved system includes the motor 35 therein in the automatic mode and the controller 87 therein in both the stability and manual modes and accordingly includes alternatively operable means for providing a primary input to the link 31 including a manually operable controller operatively connected to the link and a servomotor or hydraulic motor 35 carried by the housing 14 connected to the link. In both stability and manual modes, the motor 35 is rendered ineffective. To obtain this result in the arrangement shown in FIG. 4, the system includes a normally ineffective bypass for the hydraulic motor 35. This structure includes a bypass valve 109 having a slide member 110 with lands 111 and 112 movable in a cylindrical cavity 113 in the housing 14. A bypass chamber 114 is provided in the valve 109 between the lands 111 and 112. Passageways 115 and 116 in the housing 14 connect the chamber 114 to the respective ends of the cylinder chamber 91 of the motor 35. In the position of the parts shown, the bypass is rendered ineffective as land 111 blocks the fluid circuit to the chamber 114 at the end of the passageway 115 adjacent the valve 109. The valve 109 is conditioned as shown in the drawing by a piston 117 located at one end of the slide member 110 through fluid pressure thereon in the chamber 138 to the left of the piston 117. This pressure is provided through hydraulic valve 99 from passageway 100 connected to pressure passageway 22, the connection from valve chamber 98 being by way of passageway 97' and passageway 118. The chamber 119 to the right of piston 117 and between the piston 117 and land 111 is connected to pressure passageway 22 by passageway 120. As the net force on the right of the piston 117 in chamber 119 is less than that on the left of the piston 117 in chamber 138, the parts are conditioned as shown in FIG. 4 with the provided bypass means rendered ineffective.

The means for rendering the bypass means effective include the hydraulic valve 99. As shown in FIG. 4, valve 99 includes a slide member 121 with end lands 122, 123 and center land 124 movable in a cylindrical cavity 125 in the housing 14. The chamber 98 of the valve is located between lands 123 and 124. A further chamber 126 is provided in the valve 99 between the lands 122 and 124. In the position of the valve 99 shown in FIG. 4, the winding 127 of relay 128 is energized and the armature end of the slide member 121 is urged to the left as viewed in the figure to compress a spring 129 located between land 122 and the closed end of the cavity 125. In this condition of the conditioning means, the mode selector switch 61, FIG. 3, is in the automatic position A and the circuit to winding 127 is closed. This circuit includes battery 71, lead 72, switch blade 62, lead 73 and connecting lead 130 to the winding 127. When switch blade 62 is set in either the stability or manual positions of the switch, the circuit to relay 128 is broken and the winding 127 is unenergized. This renders the bypass means for the servomotor 35 effective. In this connection, the slide member 121 of valve 99 is moved to the right as viewed in FIG. 4 by the spring 129 so that the chamber 138 to the left of piston 117 of valve 109 is connected to the sump or return fluid passageway 28 of the system instead of the pressure passageway 22. The chamber 126 of valve 99 then connects passageways 118 and 97' to a passageway 131 connecting with the return passageway 28. In this position of the relay valve stem 121, the fluid from the supply source is trapped by the valve 99 in the chamber 98 between the lands 124 and 123. The fluid pressure in the chamber 119 to the right of piston 117 then moves the slide member 110 so that land 111 moves to the left to connect passageway 115 to the bypass chamber 114. The provided open hydraulic flow line connects the respective chambers to the right and left of piston 92 of servomotor 35 through the passageways 115, 116 and the connecting bypass chamber 114.

The system also includes means for nulling the output of the automatic pilot means to the servomotor 35 when the system is conditioned for operation by the manually operable controller 87 in either the stability or manual modes of operation. As shown in FIGS. 2 and 3, the automatic pilot means includes a pick-off or synchro 132 of the selsyn type that provides an output depending on the displacement of the controller from a null position. As indicated in FIG. 2, the rotor of pick-off is connected by suitable shafting 133 to be moved by the controller 87. The stator of the pick-off 132 is shown as fixed to the frame 10 of the craft, the output thereof being fed to amplifier 107 by way of lead 134 and connecting lead 106. To retain the feel of the stick operation in the system, a spring self centralizing device is included as indicated at 135 in FIG. 2, one part of the device being connected to link 90 and the other part being fixedly mounted on the frame 10 of the craft.

To null the output of amplifier 107 and accordingly the output of torque motor 105 to the valve 95 of servomotor 35, the system includes nulling means that is ineffective when it operates in the automatic mode. As shown in FIGS. 2 and 3, such means includes a relay 136 whose winding 137 is energized to open the circuit controlling the nulling means by a switch indicated at 139 in FIG. 3. In this view, the armature of the energized relay 136 positions the movable blade 140 on an open contact of the switch. Winding 137 of the relay 136 is energized when switch 61 is set in the automatic position from battery 71, by way of lead 72, switch blade 62 and lead 73. The ineffective nulling means shown in FIG. 2 includes lead 141 to lead 108, open switch 139, lead 142, amplifier 143 and lead 144 to the motor 145 of a suitable motor generator set 146. The set 146 includes a generator 147 and pick-off or synchros 148 that are driven by the output shaft of the motor 145. A signal proportional to the speed of operation of the motor 145 is fed the input lead 134 to amplifier 107 from the generator 147 by way of lead 149. A signal in accordance with the angular displacement of the shaft of the motor 145 is fed the input lead 134 to amplifier 107 from the synchro or pick-off 148 by way of lead 150. The nulling means is rendered effective by changing the setting of switch blade 62 to either the stability or manual position terminals S or M shown in FIG. 3. With either of these settings, the circuit to relay 136 is opened and the winding 137 is unenergized thereby permitting blade 140 to engage the closing contact of switch 139 to close the circuit to the motor 145 by way of lead 141, closed switch 139, lead 142, amplifier 143 and lead 144 from the amplifier 107. The motor 145 operates to provide inputs to the amplifier 107 from generator 147 and synchro or pick-off 148 that null the output of the pick-off 132 under control of controller 87 and the displacement output of the automatic pilot means to the amplifier provided by the pitch attitude reference 48. The described nulling means is included in the system when it is conditioned to operate in the stability mode or the manual mode. In either of the noted modes, the primary input to the link 31 is provided by the manual controller 87. In the stability mode, the secondary input provided the system from servomotor 34 functions to damp the operations of the system. As this action is provided through motion of the end of the link 31 opposite to the connection therewith of link 88, it is not felt by the human pilot at the spring restrained controller 87.

When the switch 61 is set in the M position the winding 69 of relay 70 is unenergized and the piston 37 of servomotor 34 is centered with respect to housing 14 so that this input to the summing link 31 is nulled. Movement of the primary control valve 13 is then effected only through the connection between the link 31 and the manual controller 87.

Direct control of the elevator 11 of the craft from the manual controller 87 is provided in the event of failure of or loss in the fluid pressure in the hydraulics of the system for any reason. The structure provided in the system to obtain this result includes the piston-cylinder means constituting servomotor 35 whose rod 93 connects with link 31 through connecting link 94. The means provided fixes this end of the link 31 with respect to the housing 14 so that the controller 87 is then connected to the elevator 11 through link 90, lever 89, link 88 to fixed link 31 to housing 14 to the elevator. Such means includes a second piston-cylinder means shown in FIG. 4 where the cylinder 151 is in the housing 14 and piston 152 is connected to piston 92 by the rod 153'. A further hydraulic valve 153 with a slide member 154 having lands 155, 156 with a chamber 157 therebetween that with passageways 158, 159 provide a normally open fluid passageway in the housing that normally connects the respective ends of the cylinder 151. In this connection, fluid pressure to the left of land 155 obtained by pressure line 22 by way of passageway 158' is effective to compress the spring 159' between the end land 160 of member 154 and the end of the chamber in which the member 154 moves. Spring 159' constitutes a biased means that is operable to move the member 154 with loss in fluid pressure in the system to the left in FIG. 4 so that the land 156 covers the passageway 159 and accordingly traps the fluid in the cylinder 151 and thereby prevents relative movement between the piston 152 and the housing 14. At the same time, the passageways 160', 161 to the respective sides of the piston 15 of the primary cylinder are connected by the chamber 162 provided in the member 154 between the lands 156 and 160. This unlocks the housing 14 from piston 15 and enables the human pilot to move the elevator 11 from the controller 87.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. In a combined manual and automatic servo system for controlling the attitude of a dirigible craft about an axis, a primary hydraulic motor having a control valve and a movable housing connected to the craft to follow the motion of the valve, a summing link connected to move the control valve, automatic pilot means providing an output depending on the displacement of the craft from a reference attitude about the axis and providing an output depending on the rate of change of the displacement output, alternatively operable means for providing a first input to said link including a manually operable controller operatively connected to the link and a first hydraulic motor carried by the housing and connected to the link and having a control valve responsive to the displacement output of said automatic pilot means, a second hydraulic motor carried by the housing connnected to provide a second input to the link to damp the system and having a control valve responsive to the rate output of said automatic pilot means, and means for conditioning said alternatively operable means for operation by the automatic pilot means.

2. A system of the character claimed in claim 1, including normally ineffective means for nulling the input to the link from the second hydraulic motor, and means for rendering said nulling means effective when the system is conditioned by said conditioning means for operation by the manually operable controller.

3. A system of the character claimed in claim 1, including a pick-off operatively connected to said manual controller providing an output according to the displacement of the controller from a null position, normally ineffective means for nulling the pick-off output and automatic pilot output to the first hydraulic motor, a normally ineffective hydraulic bypass for said first hydraulic motor, and means operable to render said nulling means effective and said hydraulic bypass effective when the system is conditioned by said conditioning means for operation by the manually operable controller.

4. In a combined manual and automatic servo system for controlling the attitude of a dirigible craft about an axis, an hydraulic servomotor having a control valve and a movable housing connected to the craft to follow the motions of the valve, differential means having two inputs and an output connected to move the control valve of the hydraulic servomotor, means for providing an alternative input to said differential means including a manually operable controller connected to the differential means and a first servomotor carried by the housing connected to the differential means, a second servomotor carried by the housing connected to provide the other of the inputs to said differential means, means for operating said first servomotor according to the displacement of the craft from a reference attitude about its axis to control the system, means for operating said second servomotor according to the rate of change of the attitude of the craft about the axis to damp the system, and means for conditioning said alternative input providing means for operation by said first servomotor.

5. A system of the character claimed in claim 4, including normally ineffective means for nulling the input to the differential means from the second servomotor, and means for rendering said nulling means effective when the system is conditioned for operation by the manually operable controller.

6. In a servo system for controlling the attitude of a dirigible craft about an axis, a primary hydraulic motor having a control valve and a movable housing connected to the craft to follow the motion of the valve, a summing link connected to move said control valve, automatic pilot means providing an output depending on the displacement of the craft from a reference attitude about the axis and providing an output depending on the rate of change of the displacement output, a first hydraulic servomotor carried by the housing connected to provide a first input to said link to operate the system having a control valve responsive to the displacement output of said automatic pilot means, and a second hydraulic servomotor carried by the housing connected to provide a second input to said link to damp the system having a control valve responsive to the rate output of said automatic pilot means.

7. In a servo system for controlling the attitude of a dirigible craft about an axis, an hydraulic servomotor having a control valve and a movable housing connected to the craft to follow the motion of the valve, differential means having two inputs and an output conneced to move the control valve of the hydraulic servomotor, a first servomotor carried by the housing connected to provide one of the inputs to said differential means, a second servomotor carried by the housing connected to provide the other of the inputs to said differential means, means for operating said first servomotor according to the displacement of the craft from a reference attitude about the axis to control the system, and means for operating said second servomotor according to the rate of change of attitude of the craft about the axis to damp the system.

8. In a servo system for controlling the attitude of a dirigible craft about an axis, a primary hydraulic motor having a control valve and a movable housing connected to the craft to follow the motion of the valve, automatic pilot means providing outputs depending on the displacement and rate of change of displacement of the craft from a reference attitude about the axis, a summing link connected to move said control valve, a first servomotor carried by the housing connected to provide one of the inputs to the summing link, means for operating said first servomotor depending on the displacement output of said automatic pilot means, a second servomotor carried by the housing connected to provide the other of the inputs to said summing link, and means for operating said second servomotor depending on the rate of change output of said automatic pilot means.

9. A system of the character claimed in claim 8, in which said first servomotor is an hydraulic servomotor, and said system includes a normally ineffective hydraulic bypass for the hydraulic servomotor, normally ineffective means for nulling the output to the link from the second servomotor, normally ineffective means for providing an alternative input to said link for the first servomotor including a manually operable controller, and means for conditioning the system for operation by the manual controller with the alternative input means effective, the output nulling means rendered effective, and the hydraulic bypass for the hydraulic servomotor effective.

10. In a system for controlling the attitude of a dirigible craft about an axis, means including a differential link with an output operable to move the craft about its axis, a manually operable controller providing an input to the link; ineffective means for providing an alternative input to said link including a servomotor operatively connected to the link, a synchro providing an output depending on the displacement of the controller from a null condition with relation to the craft, means providing an output depending on the displacement of the craft from a reference attitude about its axis, means responsive to the outputs of said synchro and said displacement output means for providing a nulling input to the servomotor; and means for rendering said alternative input means effective and said nulling input means ineffective.

11. In a fluid pressure system for controlling the attitude of a dirigible craft about an axis, an hydraulic motor having a control valve and a movable housing connected to the craft to follow the motions of the valve, a differential link connected to move the control valve, means for providing an alternative input to said link including a manually operable controller and a hydraulic servomotor carried by the housing having piston-cylinder means operatively connected to the link and an operating control valve, second piston-cylinder means in the housing with a piston connected to the piston of the servomotor, a normally open fluid pasageway in the housing connecting the respective ends of the cylinder of the second piston-cylinder means, and biased means carried by the housing operable with loss in fluid pressure in the system to close the fluid passageway and trap the fluid in the second cylinder to thereby position the piston of the servomotor with relation to the housing.

12. In a servo system for controlling the attitude of a dirigible craft about an axis, a primary hydraulic motor having a control valve and a movable housing connected to the craft to follow the motion of the valve, a summing link connected to move said control valve, a manually operable controller connected to provide a first input to the summing link, ineffective means for providing an alternating first input to the link including an alternative first input to the link including a first servomotor carried by the housing operatively connected to the link, means for operating said first servomotor depending on the displacement of the craft from a reference attitude in relation to the axis, a second servomotor carried by the housing connected to provide a second input to the summing link, means for operating said second servomotor depending on the rate of change of attitude of the craft about the axis, and means for rendering said alternative input providing means effective.

13. In a servo system for controlling the attitude of a dirigible craft about an axis, a primary hydraulic motor having a control valve and a movable housing connected to the craft to follow the motion of the valve, a summing link connected to move said control valve, a manually operable controller connected to provide a first input to the summing link, an hydraulic motor carried by the housing connected to the link to provide an alternative first input to the link, an effective hydraulic bypass for the alternative hydraulic motor, means for operating the alternative hydraulic motor depending on the displacement of the craft from a reference attitude about the axis, means for nulling the input to the alternative hydraulic motor from the displacement operating means, a servomotor carried by the housing connected to provide a second input to the summing link, means for operating said servomotor depending on the rate of change of attitude of the craft about the axis, and means for conditioning the system to include the alternative hydraulic motor operable to render the hydraulic bypass ineffective and render the input nulling ineffective.

References Cited in the file of this patent

UNITED STATES PATENTS

| | | |
|---|---|---|
| 2,346,857 | Meredith | Apr. 18, 1944 |
| 2,739,771 | Meredith | Mar. 27, 1956 |
| 2,877,968 | Granan et al. | Mar. 17, 1959 |
| 2,940,694 | Barlow | June 14, 1960 |